United States Patent
Stephens et al.

[15] 3,664,459
[45] May 23, 1972

[54] EXTENDABLE SCAFFOLD

[72] Inventors: James M. Stephens, Long Beach; Erven Tallman, Los Angeles, both of Calif.

[73] Assignee: Shur-Lift Trailer & Manufacturing Co., a division of Norco Sales & Manufacturing Co., Sun Valley, Calif.

[22] Filed: Aug. 28, 1970

[21] Appl. No.: 67,705

[52] U.S. Cl. ........................................... 182/141, 182/63
[51] Int. Cl. ............................................................ E04g 1/22
[58] Field of Search .............. 182/63, 141, 148, 69; 214/512; 254/122

[56] References Cited

UNITED STATES PATENTS

| | | |
|---|---|---|
| 3,110,476 | 11/1963 | Farris ........................................ 182/141 |
| 3,472,337 | 10/1969 | Atchey ........................................ 182/2 |
| 2,935,218 | 5/1960 | Fritz ........................................ 182/63 |
| 3,446,379 | 5/1969 | Phillips ........................................ 182/141 |

FOREIGN PATENTS OR APPLICATIONS

| | | |
|---|---|---|
| 1,228,401 | 3/1960 | France ........................................ 214/512 |

*Primary Examiner*—Reinaldo P. Machado
*Attorney*—Beehler & Arant

[57] ABSTRACT

An extendable scaffold mountable to a standard pickup truck body and including a working platform, two scissor linkages, a base and a hydraulic mechanism which combine to allow the working platform to be extended to a maximum height or any intermediate height and yet be collapsed to a very compact position when not in use.

9 Claims, 7 Drawing Figures

INVENTORS:
James M. Stephens
Erven Tallman

ATTORNEYS

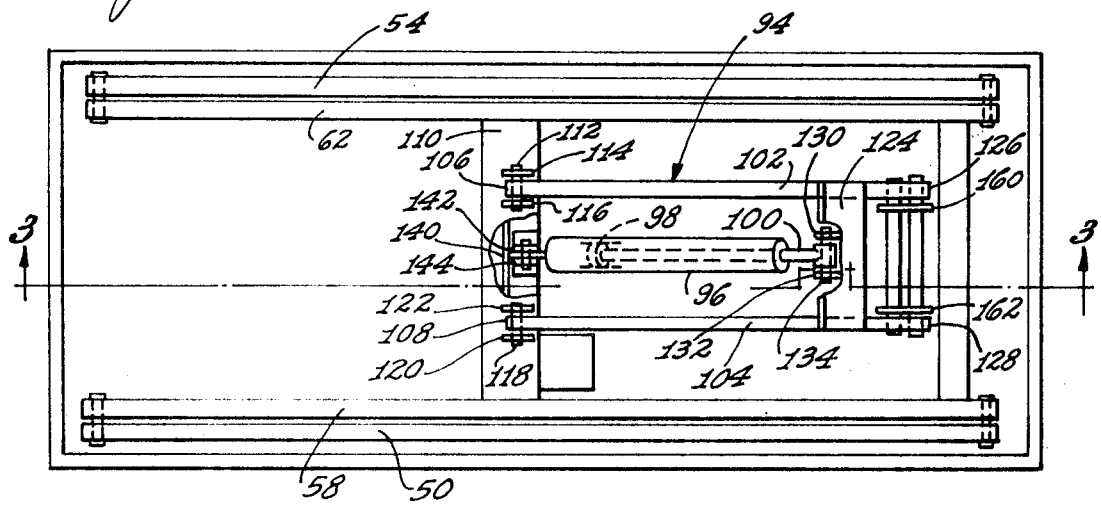
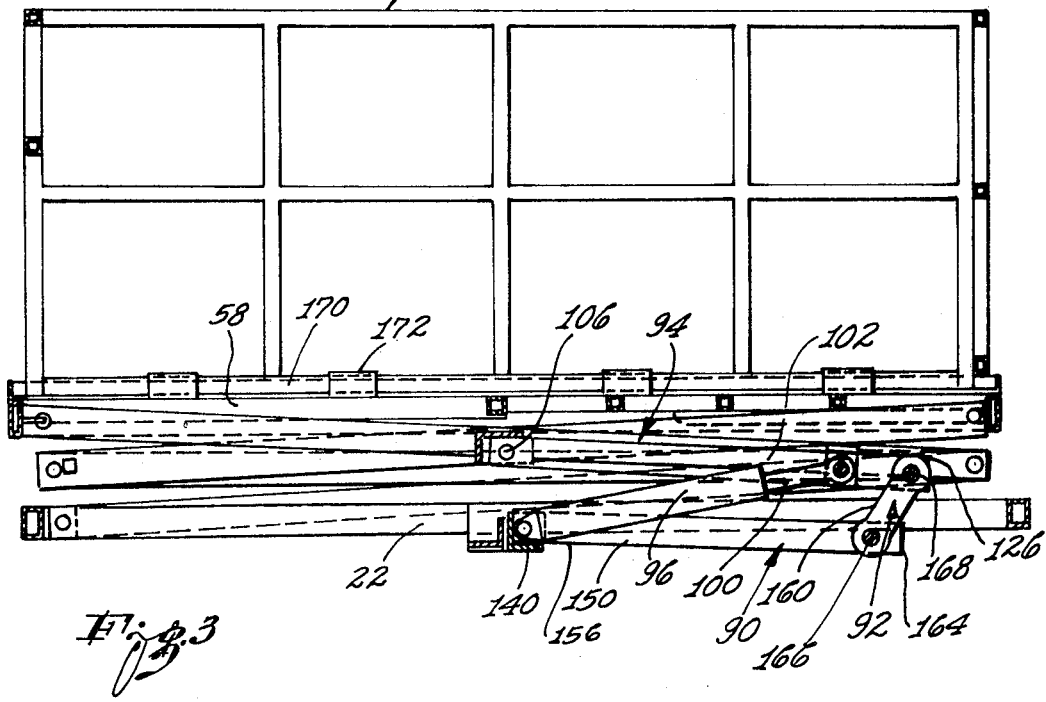

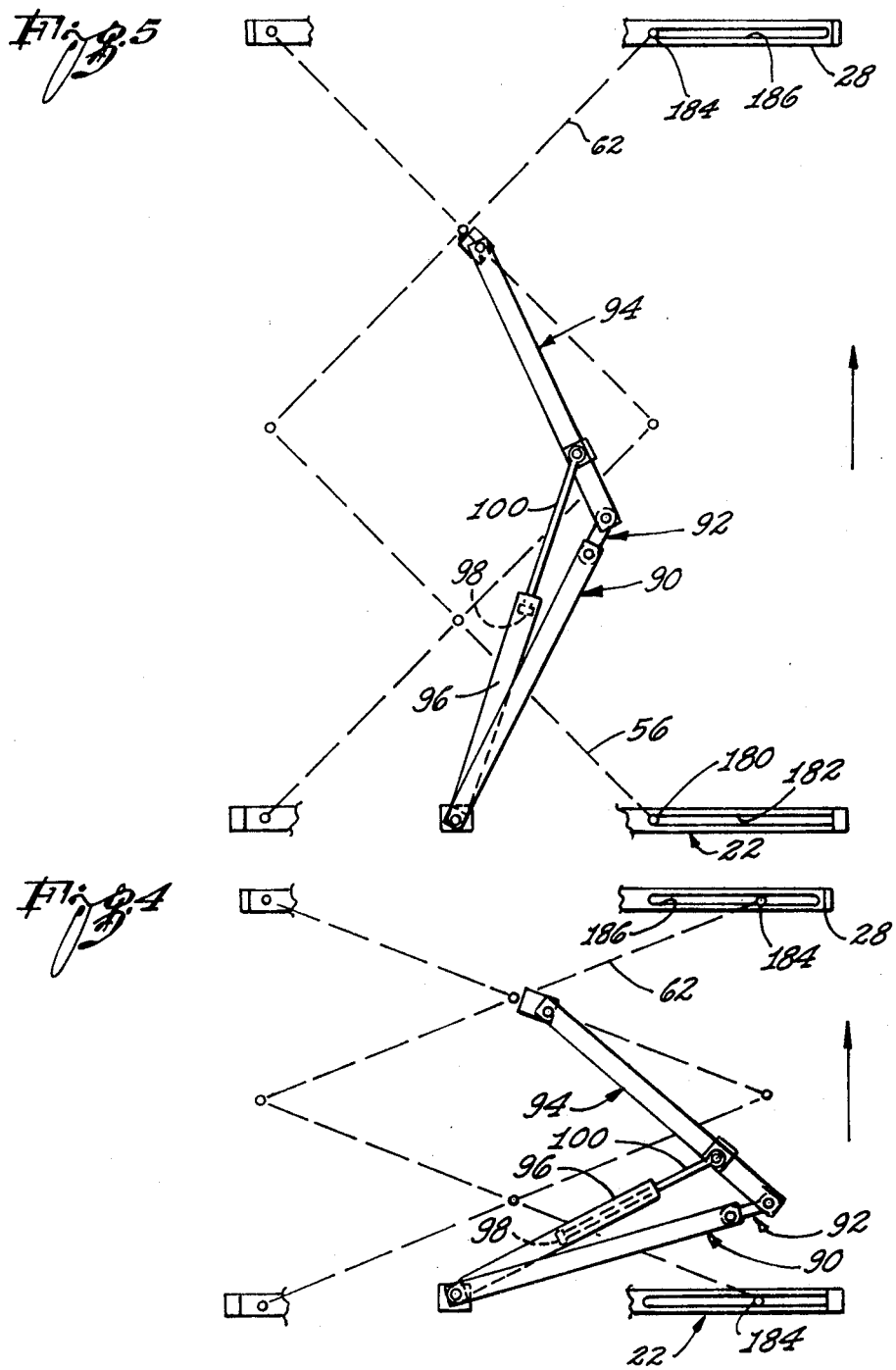

EXTENDABLE SCAFFOLD

BACKGROUND OF THE INVENTION

1. Field of the Invention

The present invention relates to a scaffold and more particularly to an extendable scaffold which is mountable to a standard pickup truck body.

2. Description of the Prior Art

An extendable work platform mounted to a pickup truck body is known in the prior art, as shown in U. S. Pat. No. 3,472,337, which illustrates a portable collapsible scaffold. A major purpose of the extendable work platform mountable to a pickup truck body is to provide a relatively low cost work platform for economically small businessmen. However, to date, the prior art extendable scaffolds or work platforms have been expensive, overly complicated, unreliable, or so bulky as to require the use of excessive space in the cargo carrying portion of the pickup truck.

SUMMARY OF THE INVENTION

The present invention obviates the disadvantages of the prior art by providing an extendable scaffold comprising in combination a support structure; a pair of extendable scissor linkages each connected at one end to said support structure; a platform connected to each of the other ends of said scissor linkages; a lower actuator link pivotally connected at one end to said support structure; a mid-actuator link pivotally connected at one end to the other end of said lower actuator link; an upper actuator link pivotally connected at one end to the pair of scissor linkages and at its other end to the other end of said mid-actuator link; and a hydraulic cylinder, piston and piston rod unit positioned between said scissor linkages, said cylinder pivotally connected to said support structure and said rod pivotally connected to said upper actuator link whereby said scaffold is movable between a compact, folded collapsed position and an extended lifted position.

An object of the present invention is to provide an extendable scaffold which is reliable in operation, relatively inexpensive, and simply constructed.

Another object of the present invention is to provide an extendable scaffold which folds or collapses to a compact, easily carried structure.

Still another object of the present invention is to provide an extendable scaffold which may be extended to a maximum height or to any height intermediate the maximum position and the collapsed or folded position.

Yet another object of the present invention is to provide a hydraulic lifting mechanism for an extendable scaffold which is reliable and simply constructed.

Another object of the present invention is to provide a hydraulic lifting mechanism for an extendable scaffold which collapses to a very compact, low profile position.

Another object of the present invention is to provide a hydraulic lifting mechanism for an extendable scaffold which when operated keeps the work platform in a horizontal position during all operations of the hydraulic lifting mechanism.

Still another object of the present invention is to provide an extendable scaffold which can be mounted to and carried by a standard pickup truck and yet not interfere to any substantial extent with the load carrying capacity of the pickup truck.

BRIEF DESCRIPTION OF THE DRAWINGS

FIG. 2 is a plan view illustrating the placement of the hydraulic lifting mechanism and the scissor linkages.

FIG. 3 is a sectional elevational view taken along line 3—3 of FIG. 2 and illustrating the scaffold and hydraulic lifting mechanism in a collapsed position.

FIG. 4 is an elevational view partially diagrammatic illustrating the scaffold and hydraulic lifting mechanism in a partially extended position.

FIG. 5 is an elevational view partially in diagrammatic form illustrating the scaffold and hydraulic lifting mechanism in a fully extended position, such as shown in FIG. 1.

DESCRIPTION OF THE PREFERRED EMBODIMENT

Figure 1:
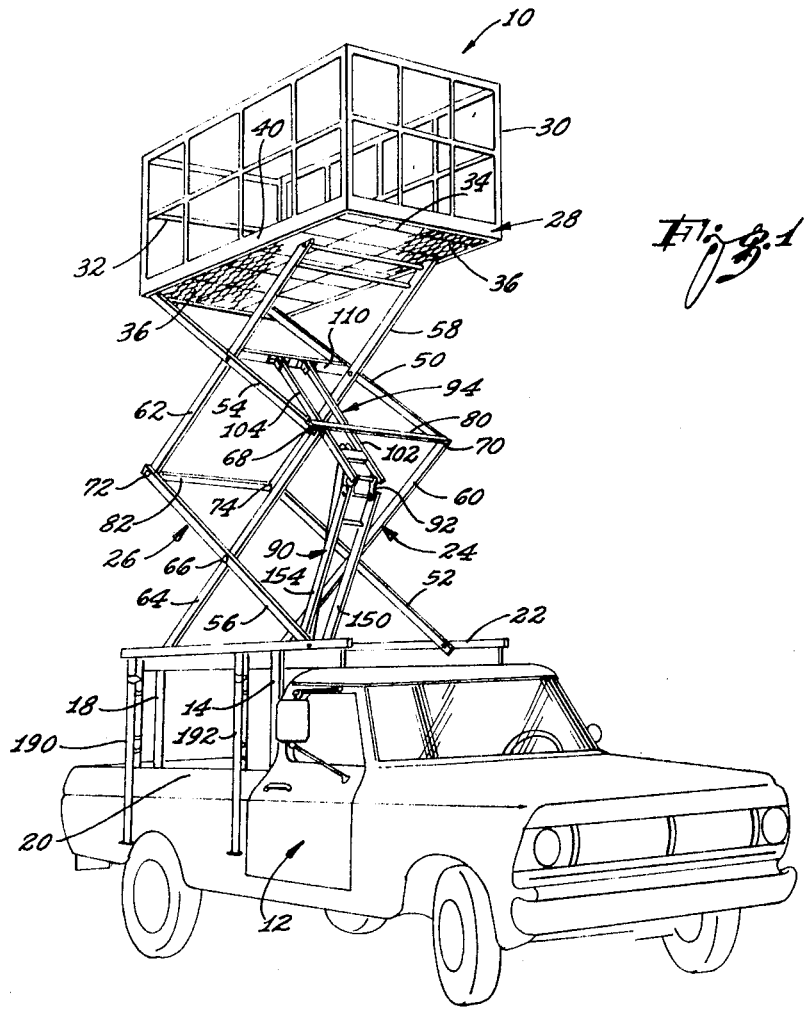
FIG. 1 is a perspective view of the scaffold in an extended position mounted to a standard pickup truck.
Figure 6:
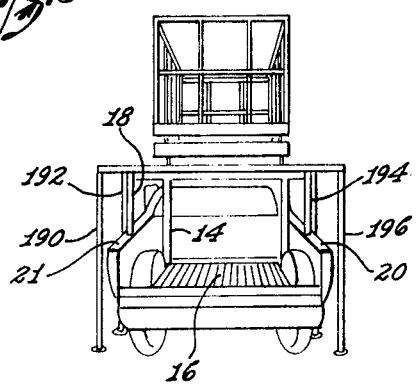
FIG. 6 is an elevational perspective view illustrating the extendable scaffold in a collapsed position but with the guard rail in an up position.

Referring now to FIGS. 1 and 6, there is illustrated an extendable scaffold 10 in an extended position as it is mounted to a standard pickup truck body 12. Bolted to the truck body 12 is a support structure including a support loop 14 (more clearly shown in FIG. 6) which is a rectangular shaped loop of tubing that is attached to the floor 16 of the pickup truck in a manner which allows its easy removal. A suitable method is to attach U-shaped bolts around the portion of the support loop which abuts the floor of the pickup truck. Included in the support structure is a support bridge 18, which is a U-shaped tubular member bolted directly to the side panels 20, 21 of the pickup truck using standard bolts and is also easily separable from the pickup truck body. Connected to both the support loop 14 and the support bridge 18 in a horizontal position is a stationary base frame 22 in the shape of a rectangular loop of tubular material.

Pivotally connected to the stationary base frame 22 are two extendable scissor linkages 24 and 26 which in turn are connected to a platform base 28. The platform base forms the working area positionable at any height between the scaffolds collapsed position and its maximum height. Surrounding the platform base is a pivotal guard rail 30 and a gate 32 with encloses the region used by workmen and is a major safety feature.

The platform base is a rectangular loop of tubular material with transverse bars 34 connecting the two longer arms and parallel with the shorter arms of the platform base to form a support for a layer of steel mesh 36 which is attached to the platform base to form a working floor. Just above the floor and attached to the guard rails is a base barrier plate 40 extending about six inches in height which functions to prevent tools or material located on the working floor from accidentally falling over the edge. The mechanism of the guard rail will be explained more fully hereinbelow.

Each of the scissor linkages comprise two outer scissor links, such as upper outer link 50 and lower outer link 52 of the linkage 24 and upper outer link 54 and lower outer link 56 of linkage 26. In addition, each of the linkages includes two inner links, such as upper inner link 58 and lower inner link 60 of the linkage 24 and upper inner link 62 and lower inner link 64 of the linkage 26. Corresponding sets of an inner link and an outer link are pivotally connected at their mid-points by a shaft extending through mating openings in the links, such as a shaft 66 through the inner link 64 and the outer link 56. Upper outer link 54 is connected to the lower inner link 64 by a shaft 68 which extends through corresponding openings adjacent the ends of the links. In a like manner, the lower inner link 60 is connected to the upper outer link 50 by a shaft 70, the lower outer link 56 is connected to the upper inner link 62 by a shaft 72, and the upper inner link 58 is connected to the lower outer link 52 by a shaft 74. In a similar manner, the lower inner links 60 and 64 are pivotally connected to the stationary base frame 22 while the upper outer links 50 and 54 are pivotally connected to the platform base 28. The inner upper links 58 and 62 are also pivotally connected to the platform base 28, and in addition the pivots are allowed to have limited translational movement as are the pivots connecting the outer lower links 52 and 56 to the stationary base frame 22, which will be explained in more detail hereinbelow. Two transverse stiffener elements are provided connecting the two scissor linkages; one stiffener element 80 is attached to the upper outer links 50 and 54 and a second stiffener element 82 is connected to the upper inner links 58 and 62.

A hydraulic lifting mechanism includes three links, a lower actuator link 90, a mid-actuator link 92, and an upper actuator link 94. In addition, a hydraulic cylinder, piston, and piston rod unit is included in the hydraulic lifting mechanism.

Referring now to FIG. 2, the hydraulic cylinder 96, the piston 98, and the piston rod 100 are illustrated in more detail. The upper actuator link includes two parallel beams 102 and 104 which are pivotally connected at their respective end portions 106 and 108 to a transverse angle iron 110 which is connected to the upper inner links 58 and 62, as more clearly shown in FIG. 1. The beams 102 and 104 are pivotally connected to the angle iron 110 by having a shaft 112 positioned through openings in flanges 114 and 116 and the beam 102 and a shaft 118 positioned through openings in two flanges 120 and 122 and the beam 104. A transverse beam 124 is attached to the parallel beams 102 and 104, spaced from opposite end portions 126 and 128, respectively, and provides with two flanges 130 and 132 means for pivotally connecting the piston rod 100 to the upper actuator link 94, again with a shaft 134 extending through aligned openings in the flanges 130 and 132 and the piston rod 100.

A second angle iron 140, FIGS. 2 and 3, is connected across the base frame 22 and provides with two flanges 142 and 144 means for pivotally connecting the hydraulic cylinder 96.

Referring once again to FIG. 1, the lower actuator link 90 is comprised of two parallel beams 150 and 154 which are pivotally connected to the angle iron 140 at one of its end portions, such as end portion 156 of beam 150.

Pivotally connected to both the upper and lower actuator links is the mid-actuator link 92 which is comprised of two parallel beams 160 and 162, FIG. 2. As more clearly shown in FIG. 3, the beam 160 is pivotally connected at each of its ends to the end portion 126 of the beam 102 and to the beam 150 at its end portion 164. Once again, the pivotal connection is achieved by a shaft positioned through aligned openings in the beams, such as the shaft 166 and the shaft 168. In a like fashion, the beam 162 is connected to the beams 104 and 154.

Figure 7:
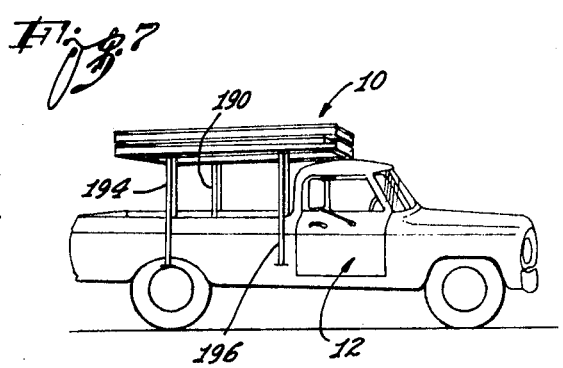
FIG. 7 is an elevational perspective view illustrating the extendable scaffold in a completely collapsed position.

Referring now to FIG. 3, there is illustrated in more detail the pivotal or collapsible guard rail 28. The guard rail comprises square or rectangular tubing except along the base portion extending parallel to the platform base 58. This base portion comprises a round tube 170 which is positioned through a number of cylindrical sleeves 172 which act to constrain the guard rail to the platform base and to allow the guard rail to pivot from a position essentially perpendicular to the platform base, as illustrated in FIGS. 1 and 3, to a position where the guard rails are essentially parallel to the platform base, as illustrated in FIG. 7.

In operation the hydraulic lifting mechanism expands in a sequence, as illustrated in FIGS. 3, 4, and 5. In FIG. 3 the hydraulic lifting mechanism and the scaffold is shown in a compact or collapsed position, except for the guard rail 28, which is shown in an extended or upright position. In FIG. 4 the hydraulic lifting mechanism is partially extended with the scissor linkage being shown in diagrammatic form. In FIG. 5 the hydraulic lifting mechanism is illustrated in a fully extended position.

Referring again to FIG. 5, the pivotal connections of the links 56 and 62 are more clearly shown and comprise a shaft, such as 180, which is constrained to move within a slot 182 formed in the base frame 22. In a like fashion, a shaft 184 is connected to the link 62 and is constrained to move in a slot 186 formed in the platform base 28. The shafts 180 and 184 are free to move along their respective slots 182 and 186 from right to left, as illustrated in FIG. 5, during the process of extending, while the reverse translation occurs, from left to right, when the scaffold is being collapsed.

It is to be noted that as the scaffold is extended from its FIG. 3 position to its FIG. 5 position, the angle between the lower actuator link and the upper actuator link 94 extends from a very acute angle to an angle somewhat greater than 90°. It is also to be noted that the mid-actuator link 92 is in alignment with the lower actuator link 90 during the extension process and during the collapsing process except when the scaffold is in a collapsed or nearly collapsed position, as shown in FIG. 3, at which time the mid-actuator link is mis-aligned with the lower actuator link. This misalignment allows the extreme compactness of the unit, as shown in FIG. 7.

As an example of the uniqueness of the present extendable scaffold, a preferred embodiment capable of extending the platform base 28 to a height of 14 feet above the base frame can collapse to a total height of less than 10 inches, as viewed in FIG. 7. If the base frame is mounted on a pickup truck and located approximately 6 feet above ground level then the total height of the platform base, shown in FIG. 1, is 20 feet above ground level.

Referring once again to FIGS. 1 and 6, there is illustrated four extendable leg rods 190, 192, 194, and 196. The leg rods may be hydraulic jacks or manually operated jacks which are attached to the support structure, such as by being attached to the support loop 14 and the support bridge 18. The extendable leg rods act as stabilizers, if desired, when the scaffold is in an extended position; or the leg rods may be used to support the scaffold if it is desired to disconnect the scaffold from the pickup truck, in which case the extendable leg rods are positioned as shown in FIG. 6; and the support loop and support bridge are unbolted from the pickup truck body.

What has been described is a reliable, simply constructed, and relatively inexpensive extendable scaffold and hydraulic lifting mechanism which is mountable to a pickup truck to give the scaffold efficient mobility and which does not interfere in any substantial manner with the cargo carrying capacity of the pickup truck.

We claim:

1. An extendable scaffold comprising in combination:
   a support structure;
   a pair of extendable scissor linkage means, each such pair including a set of upper links and a set of lower links, each of said sets of lower links being connected at one end to said support structure;
   a platform connected to the remote ends of the sets of upper links;
   a lower actuator link means pivotally connected at one end to said support structure;
   a mid-actuator link means pivotally connected at one end to the other end of said lower actuator link means;
   an upper actuator link means pivotally connected at one end to the sets of upper links and at its other end to the other end of said mid-actuator link means; and
   a hydraulic cylinder, piston, and piston rod unit means positioned between said pair of scissor linkage means, said cylinder pivotally connected to said support structure and said rod pivotally connected to said upper actuator link means, whereby said scaffold is movable between a compact folded collapsed position and an extended lifted position.

2. An extendable scaffold as claimed in claim 1 including a guard rail pivotally connected to said platform and movable between a position essentially parallel to said platform when said scaffold is in a collapsed stored position and essentially perpendicular when said scaffold is in use.

3. An extendable scaffold as claimed in claim 1 including four extendable leg rods connected to said support structure and positioned laterally therefrom for stabilizing said platform when said scissor linkage means are extended.

4. An extendable scaffold as claimed in claim 1 where said support structure includes a rectangular base frame to which one end of each of said scissor linkage means is connected; and including
   two cross-stiffener elements connecting said pair of scissor linkage means.

5. An extendable scaffold as claimed in claim 4 including a guard rail pivotally connected to said platform and movable between a position essentially parallel to said platform when said scaffold is in a collapsed stored position and essentially perpendicular when said scaffold is in use; and four extendable leg rods connected to said support structure and positioned laterally therefrom for stabilizing said platform when said scissor linkage means are extended.

6. A hydraulic lifting mechanism for an extendable scaffold mounted to a vehicle, said scaffold including a support structure mounted on said vehicle, a pair of extendable scissor linkage means mounted on said support structure and a platform mounted on said scissor linkage means, each of the scissor linkage means including a set of upper links and a set of lower links, the upper ends of the sets of upper links being mounted to the platform, and the lower ends of the sets of upper links being pivotally attached to the upper ends of the sets of lower links, and the lower ends of the sets of lower links being mounted to the support structure, said lifting mechanism comprising:
 a lower actuator link means pivotally connected at one end to said support structure;
 a mid-actuator link means pivotally connected at one end to the other end of said lower actuator link means;
 an upper actuator link means pivotally connected at one end to the sets of upper links in the pair of scissor linkage means and at its other end to the other end of said mid-actuator link means; and
 a hydraulic cylinder, piston, and piston rod unit means positioned between said pair of scissor linkage means, said cylinder pivotally connected to said support structure and said rod pivotally connected to said upper actuator link means.

7. A hydraulic lifting mechanism as claimed in claim 6 including
 two transverse support beams, one of which extends between the pair of scissor linkage means and the other of which extends across the support structure.

8. A hydraulic lifting mechanism as claimed in claim 6 wherein said upper actuator link means comprises two parallel beams each pivotally connected at both ends; a transverse beam joining said parallel beams at a location spaced from the ends of said parallel beams; said piston rod being pivotally connected to said transverse beam; said connection between the one end of said parallel beams and said sets of upper links being at about the common pivot point of the links in said sets of upper links.

9. A hydraulic lifting mechanism as claimed in claim 6 wherein said mid-actuator link means comprises two parallel beams pivotally connected at one pair of ends to said upper actuator link means and at the other pair of ends to said lower actuator link means, said mid-actuator link means being essentially aligned with said lower actuator link means when said scaffold is extended and misaligned when said scaffold is collapsed.

* * * * *